(12) United States Patent
Lin et al.

(10) Patent No.: US 10,289,141 B2
(45) Date of Patent: May 14, 2019

(54) METHOD FOR GENERATING POWER DISTRIBUTION NETWORK (PDN) MODEL, AND POWER DISTRIBUTION NETWORK ANALYSIS METHOD AND DEVICE

(71) Applicant: INDUSTRIAL TECHNOLOGY RESEARCH INSTITUTE, Hsinchu (TW)

(72) Inventors: Chang-Tzu Lin, Zhubei (TW); Ding-Ming Kwai, Zhubei (TW); Tzu-Min Lin, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 659 days.

(21) Appl. No.: 14/945,417

(22) Filed: Nov. 18, 2015

(65) Prior Publication Data
US 2017/0023961 A1 Jan. 26, 2017

(30) Foreign Application Priority Data
Jul. 24, 2015 (TW) .............................. 104124054 A

(51) Int. Cl.
G05F 1/66 (2006.01)
G05F 1/625 (2006.01)

(52) U.S. Cl.
CPC ................ *G05F 1/66* (2013.01); *G05F 1/625* (2013.01)

(58) Field of Classification Search
CPC ...... G05B 15/02; G06F 17/50; G06F 17/5081
USPC .......................................... 700/295; 716/136
See application file for complete search history.

(56) References Cited

U.S. PATENT DOCUMENTS

| 7,353,490 | B2 | 4/2008 | Jiang et al. |
| 8,336,018 | B2 | 12/2012 | Turner et al. |
| 8,473,762 | B2 | 6/2013 | Dennard et al. |
| 8,560,294 | B1 | 10/2013 | Ren et al. |
| 8,656,329 | B1 | 2/2014 | Kukal et al. |
| 8,742,618 | B2 | 6/2014 | Chuang et al. |

(Continued)

FOREIGN PATENT DOCUMENTS

| CN | 100485695 C | 5/2009 |
| CN | 202275460 U | 6/2012 |

(Continued)

OTHER PUBLICATIONS

Chenyun Pan et al., "A Fast System-Level Design Methodology for Heterogeneous Multi-Core Processors Using Emerging Technologies", 2015.

(Continued)

*Primary Examiner* — Dzung Tran
(74) *Attorney, Agent, or Firm* — Rabin & Berdo, P.C.

(57) ABSTRACT

A method for generating a power distribution network (PDN) is provided. A heterogeneous circuit data is input. A plurality of horizontal power lines and a plurality of vertical power lines are determined according to the heterogeneous circuit data. A PDN model of the heterogeneous circuit is determined according to the horizontal power lines and the vertical power lines. Power consumption value is assigned to a plurality of internal nodes of the PDN model of the heterogeneous circuit. The PDN model of the heterogeneous circuit is adjusted to meet a target voltage drop limitation of the heterogeneous circuit data.

9 Claims, 9 Drawing Sheets

(56) References Cited

U.S. PATENT DOCUMENTS

| | | | |
|---|---|---|---|
| 2010/0001379 A1 | 1/2010 | Lee et al. | |
| 2011/0304052 A1* | 12/2011 | Turner | G06F 17/5077 257/773 |
| 2012/0198408 A1 | 8/2012 | Chopra | |
| 2012/0242149 A1* | 9/2012 | Chuang | G06F 17/5063 307/42 |
| 2013/0212544 A1 | 8/2013 | Yu et al. | |
| 2014/0089882 A1* | 3/2014 | Yang | G06F 17/5072 716/120 |
| 2014/0101626 A1 | 4/2014 | Yu et al. | |
| 2014/0189635 A1 | 7/2014 | Yang et al. | |
| 2015/0005972 A1 | 1/2015 | Ishida et al. | |

FOREIGN PATENT DOCUMENTS

| | | |
|---|---|---|
| CN | 102655101 A | 9/2012 |
| CN | 104217043 A | 12/2014 |
| KR | 20140085742 A | 7/2014 |
| TW | 201044204 A | 12/2010 |
| TW | 201407333 A | 2/2014 |
| TW | I425377 B | 2/2014 |

OTHER PUBLICATIONS

Yi-Lin Chuang et al., "Unified Methodology for Heterogeneous Integration with CoWoS Technology", 2013.
Christian Weis, et al., "Exploration and Optimization of 3-D Integrated DRAM Subsystems", 2013.
Ke Chen et al., "CACTI-3DD: Architecture-level Modelingfor 3D Die-stacked DRAM Main Memory".
Christian Weis et al., "An Energy Efficient DRAM Subsystem for 3D integrated SoCs", 2012.
Liam Madden et al., "Advancing High Performance Heterogeneous Integration Through Die Stacking", 2012.
Taiwanese Office Action dated Sep. 10, 2016.

* cited by examiner

US 10,289,141 B2

METHOD FOR GENERATING POWER DISTRIBUTION NETWORK (PDN) MODEL, AND POWER DISTRIBUTION NETWORK ANALYSIS METHOD AND DEVICE

CROSS-REFERENCE TO RELATED APPLICATION

This application claims the benefit of Taiwan application Serial No. 104124054, filed Jul. 24, 2015, the disclosure of which is incorporated by reference herein in its entirety.

TECHNICAL FIELD

The disclosure relates in general to a method for generating power distribution network (PDN) model, and a method and a device for analyzing a PDN.

BACKGROUND

In circuit design, power distribution network (PDN) is one of the consideration factors. In the current situation, digital design process mainly includes 3 analysis models, namely, the complete PDN model (longer analysis time but higher accuracy), the high-end grain PDN model (shorter analysis time but lower accuracy) and the synthetic model (a synthesis of the above two models).

Currently, the technology and apparatus for modeling the PDN model of the heterogeneous circuit (for example, the integration of digital circuit and non-digital circuit, such as analog circuit, memory, and so on) are still not available. Therefore, it is not easy to integrate a non-digital circuit in digital design process or integrate circuits which are in different manufacturing processes.

If the PDN model of the heterogeneous circuit is generated before the synthetic analysis of voltage drop in the heterogeneous system, intellectual property information and confidential information will not be divulged, and the PDN model of the heterogeneous circuit is simulated to benefit the voltage drop analysis.

SUMMARY

The disclosure is directed to a method for generating a power distribution network (PDN) model, and a method and a device for analyzing PDN. A PDN model of the heterogeneous circuit is generated and the heterogeneous circuit is introduced in digital design process.

According to one embodiment, a method for generating a power distribution network (PDN) is provided. A heterogeneous circuit data is input. A plurality of horizontal power lines and a plurality of vertical power lines are determined according to the heterogeneous circuit data. A PDN model of the heterogeneous circuit is determined according to the horizontal power lines and the vertical power lines. Power consumption value is assigned to a plurality of internal nodes of the PDN model of the heterogeneous circuit. The PDN model of the heterogeneous circuit is adjusted to meet a target voltage drop limitation of the heterogeneous circuit data.

According to another embodiment, a PDN analysis method is provided. A PDN of a digital circuit is input. A heterogeneous circuit data is input. A PDN model of the heterogeneous circuit as described above is generated according to the heterogeneous circuit data. Digital system voltage drop analysis is performed on the PDN of the digital circuit and the PDN model of the heterogeneous circuit. The PDN of the digital circuit is adjusted according to a result of voltage drop analysis.

According to an alternative embodiment, a PDN analysis device is provided. The device includes: a heterogeneous circuit PDN model generator, a voltage drop analyzer, and a digital circuit PDN adjustor. The heterogeneous circuit PDN model generator receives a heterogeneous circuit data to generate a PDN model of a heterogeneous circuit. The voltage drop analyzer performs digital system voltage drop analysis on the PDN model of the heterogeneous circuit and a PDN of a digital circuit. The digital circuit PDN adjustor adjusts the PDN of the digital circuit according to an analysis result of the voltage drop analyzer.

The above and other aspects of the invention will become better understood with regard to the following detailed description of the preferred but non-limiting embodiment(s). The following description is made with reference to the accompanying drawings.

Figure 1:
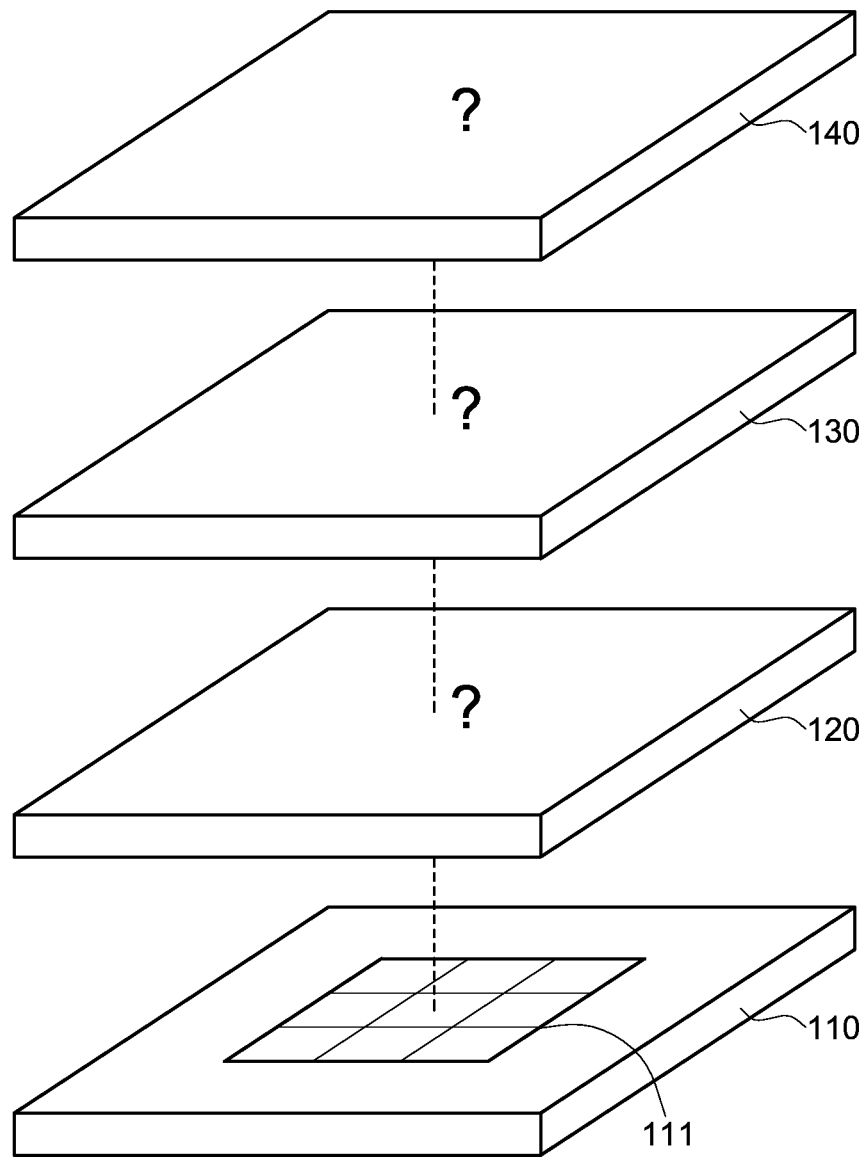
FIG. 1 shows a schematic diagram of stacking several "heterogeneous circuits" on a "digital circuit".

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

Referring to FIG. 1, a schematic diagram of stacking several "heterogeneous circuits" 120~140 on a "digital circuit" 110 is shown. Exemplarily but not restrictively, the "heterogeneous circuits" 120~140 may be realized by analog circuits and/or memories. Or, the "heterogeneous circuits" 120~140 may be realized by digital circuits whose manufacturing process is different from that of the "digital circuit" 110. Or, the "heterogeneous circuits" 120~140 may be realized by a combination of non-digital circuits and/or digital circuits. Prior to analysis, the power distribution network (PDN) model of the "heterogeneous circuit" is unknown. Prior to analysis, the PDN 111 of the "digital circuit" 110 may be already known but may be adjusted according to the analysis result. Exemplarily but not restrictively, the "digital circuit" 110 may be realized by a digital logic circuit and, the "heterogeneous circuits" 120~140 may be realized by a dynamic random access memory (DRAM). As indicated in FIG. 1, the "digital circuit" 110 and the "heterogeneous circuits" 120~140 are stacked together in a top down manner, but the present disclosure is not limited thereto. In other possible embodiments of the present disclosure, the "digital circuit" 110 and the "heterogeneous circuits" 120~140 may be stacked together in a side-by-side manner and such stacking is still within the spirit of the present disclosure. In the present embodiment illustrated in FIG. 1, the "digital circuit" 110 is stacked with the "heterogeneous circuits" 120~140, but in other embodiments, the "digital circuit" 110 may be stacked with fewer "heterogeneous circuits" (for example, the "digital circuit" 110 may be stacked with one "heterogeneous circuit").

In an embodiment of the present disclosure, during analysis of PDN model, the PDN models of the heterogeneous circuits 120~140 may be obtained, and detailed descriptions are disclosed with reference to other accompanying drawings.

Figure 2:
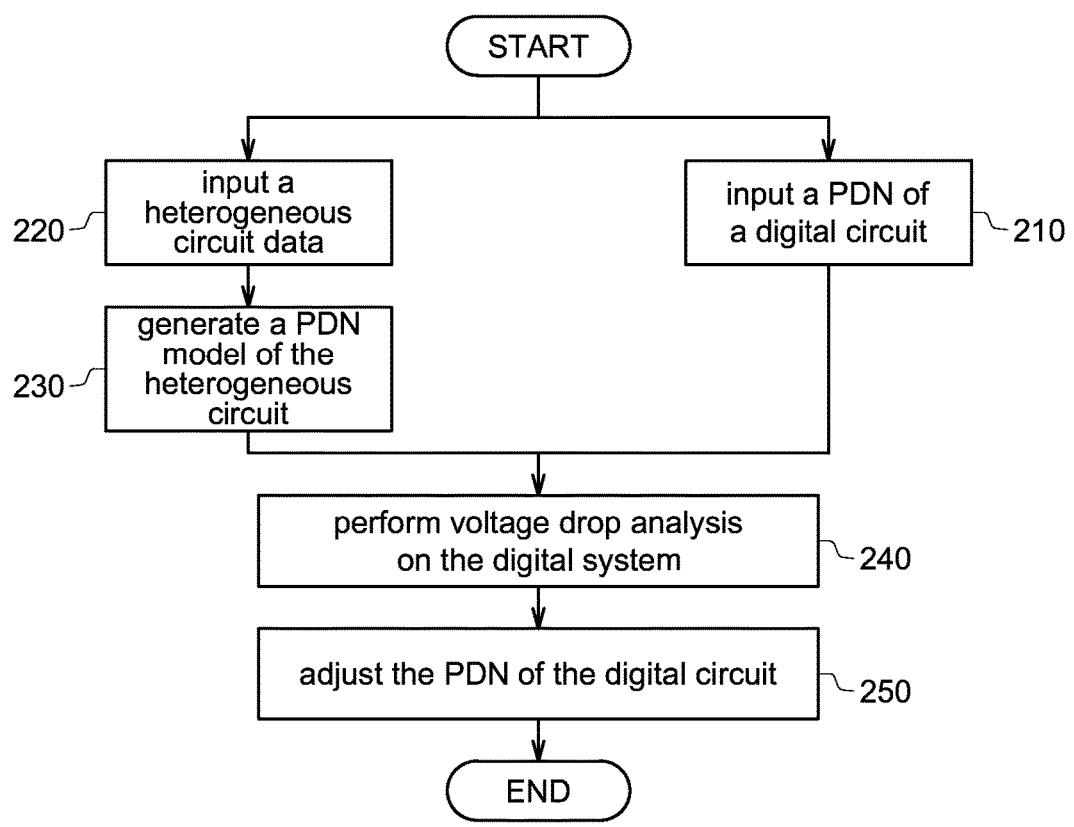
FIG. 2 shows a flowchart of analyzing a PDN model according to an embodiment of the present disclosure.

Referring to FIG. 2, a flowchart of analyzing a PDN model according to an embodiment of the present disclosure is shown. The flowchart of analyzing the PDN model as indicated in FIG. 2, exemplarily but not restrictively, may achieve system level simulation for the PDN and optimization for the PDN of the digital circuit. Refer to FIG. 2. In step 210, a PDN of the digital circuit (such as 110) is inputted. In step 220, a heterogeneous circuit data is inputted. In step 230, a PDN model of the "heterogeneous circuit" is generated, and the details of generating the PDN model are disclosed later. In step 240, a voltage drop analysis is performed on the digital system. In step 250, the PDN of the digital circuit is adjusted according to the result of voltage drop analysis. Exemplarily but not restrictively, the PDN of the digital circuit is optimized. For example, the width of one, some and/or all of the power lines of the PDN of the digital circuit may be adjusted, such that the result of system voltage drop analysis may meet the target voltage drop limitation. In other possible embodiments of the present disclosure, the PDN of the digital circuit is adjusted by increasing or decreasing the quantity of power lines.

Figure 3:
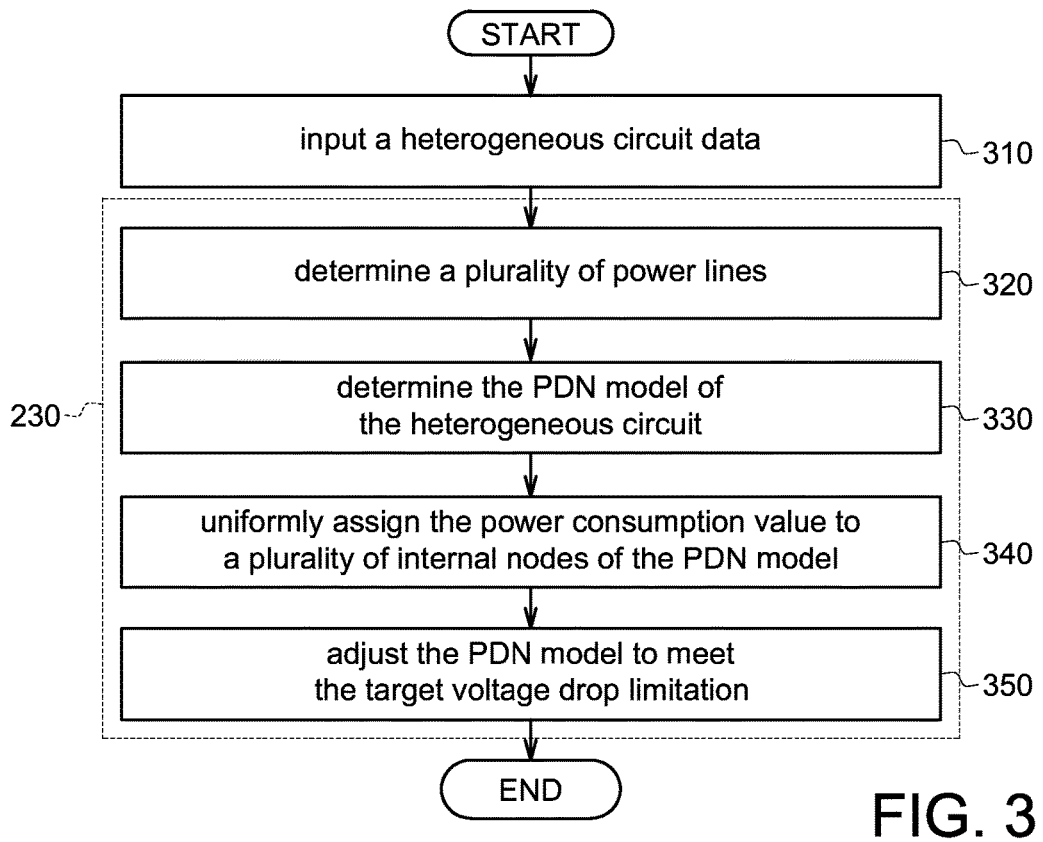
FIG. 3 shows a flowchart of a method for generating a digital PDN model of the heterogeneous circuit according to an embodiment of the present disclosure.

Referring to FIG. 3, a flowchart of a method for generating a digital PDN model of the heterogeneous circuit according to an embodiment of the present disclosure is shown. Refer to FIG. 3. In step 310, a heterogeneous circuit data is inputted. To put it in greater details, exemplarily but not restrictively, the heterogeneous circuit data includes a chip size, a power consumption value, a bump distribution data (such as bump map), a target voltage drop limitation, or any combination thereof. The chip size is dimension parameter (such as length or width) of the heterogeneous circuit. The power consumption value is such as a power consumption value in the present power domain. The heterogeneous circuit may include several power domains. If the heterogeneous circuit includes several power domains, then individual power consumption value in each power domain may be specified.

Figure 4:
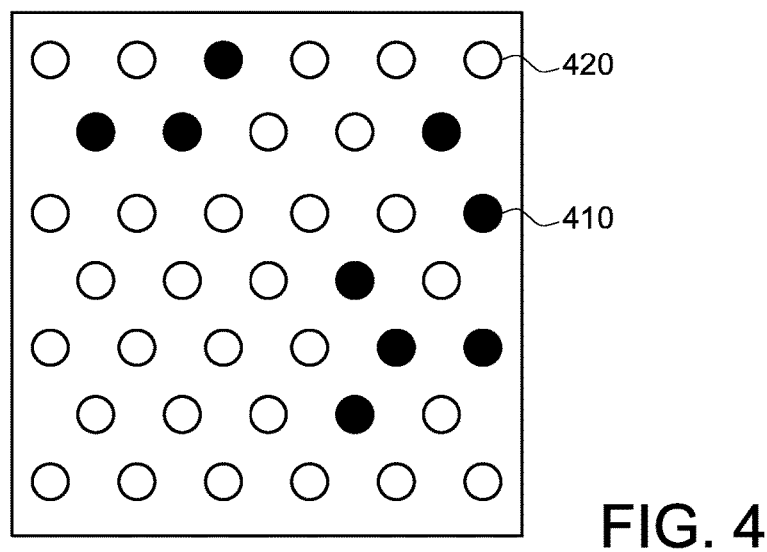
FIG. 4 shows an example of a bump map.

The bumps may include: signal bumps, power bumps and/or other bumps. The bump map is such as the distribution of all bumps in the present power domain. Each power domain corresponds to an individual bump map. FIG. 4 shows an example of a bump map. As indicated in FIG. 4, black bumps 410 denote the power bumps in the current power domain, and white bumps 420 denote signal bumps in the current power domain or power bumps in other power domains. The target voltage drop limitation refers to the target voltage drop corresponding to each node of the PDN model in the present power domain. In the present embodiment, by adjusting the power lines, the voltage drop corresponding to each node may all meet the target voltage drop limitation.

Figure 5A:
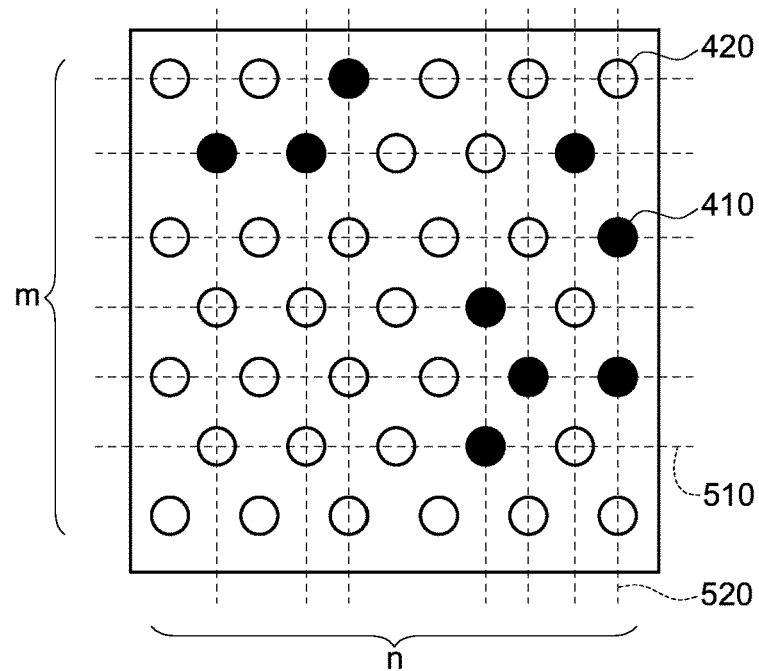
FIGS. 5A-5D show different PDN models of the heterogeneous circuit generated according to an embodiment of the present disclosure.

In step 320, a plurality of power lines are determined. Specifically, as indicated in FIG. 5A, the positions of m horizontal power lines 510 and n vertical power lines 520 are determined according to the positions of the power bumps of the bump map, wherein m and n are positive integers. FIG. 5A shows an example of a plurality of determined power lines. As indicated in FIG. 5A, each power bump is located at an intersection between one of the horizontal power lines and one of the vertical power lines. For example, the power bump 410 is located at an intersection between the third horizontal power line (counted downward from the top) and first vertical power line (counted leftward from the right-hand side).

As for the details of step 320, exemplarily but not restrictively, the positions of power bumps are respectively mapped to a horizontal axis (x-axis) and a vertical axis (y-axis) to obtain M projection points in the horizontal axis and N projection points in the vertical axis (both M and N are positive integers). "m" points are selected from the M projection points in the horizontal axis (m≤M), wherein the m points horizontally extend to generate m horizontal power lines. "n" points are selected from the N projection points in the vertical axis (n≤N), wherein the n points vertically extend to generate n vertical power lines. In the present embodiment, exemplarily but not restrictively, M=6 and N=7, and m and n are taken at their maximum values (i.e. m=7 and n=6).

Figure 5B:
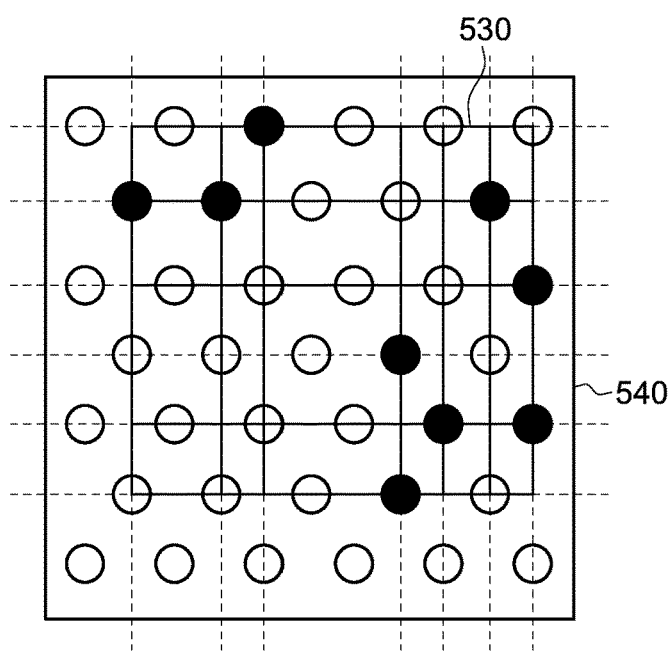

In step 330, the PDN model of the heterogeneous circuit is determined. The m×n power lines intersect to form a PDN model having a closed chessboard pattern. In the present embodiment illustrated in FIG. 5B, the boundary of the PDN model may be determined according to the positions of the power bumps (such as boundary 530), or according to the chip size (such as boundary 540). That is, the boundary 540 is the circuit boundary of the heterogeneous circuit.

Figure 5C:
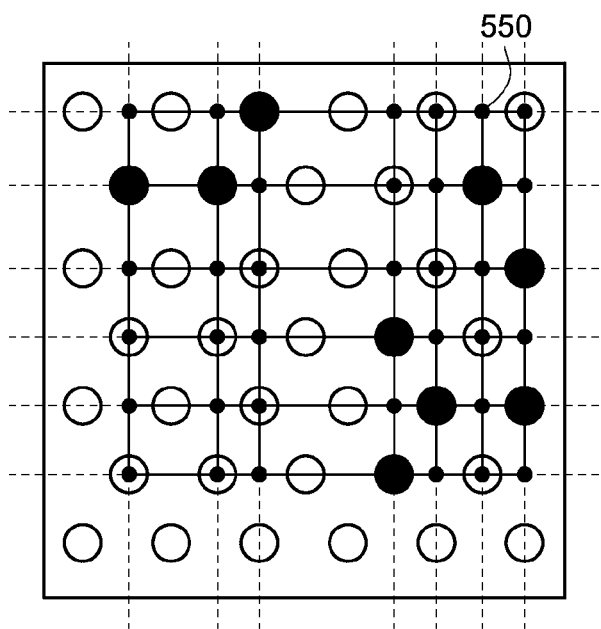

In step 340, the power consumption value is uniformly assigned to a plurality of internal nodes of the PDN model formed in step 330 as indicated in FIG. 5C. The internal nodes selectively include the power bumps. That is, the power consumption value may be selectively assigned to the power bumps.

To be more specifically, the assignment of the power consumption values may have two following scenarios, but the present disclosure is not limited thereto. If the digital circuit 110 and the heterogeneous circuits 120~140 are considered together, then the power consumption value assigned to each internal node 550 is equivalent to p_con/(m*n−b), wherein b denotes the quantity of power bumps, and p_con denotes the input power consumption value. Under such circumstance, power consumption value will not be assigned to the power bumps.

If the heterogeneous circuits 120~140 are considered but the digital circuit 110 is not considered, then the power consumption value assigned to each internal node 550 is equivalent to p_con/(m*n). Under such circumstance, the power consumption value will be assigned to the power bumps. In other embodiments, no matter the digital circuit 110 and the heterogeneous circuits 120~140 are considered together or just the heterogeneous circuits 120~140 are considered, the power consumption value assigned to each internal node 550 may be calculated as p_con/(m*n−b) or p_con/(m*n) to fit actual needs.

In step 350, the PDN model is adjusted to meet the target voltage drop limitation. For example, the width of one, some or all of the power lines of the PDN model is adjusted, so that the voltage drop of each node of the PDN model may meet the target voltage drop limitation.

Figure 5D:
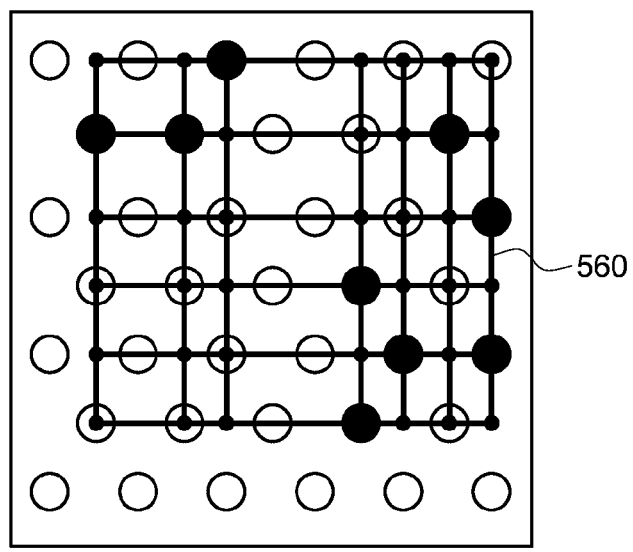

In FIG. 5D, the adjusted PDN and the nodes with power consumption form the PDN model of the heterogeneous circuit 560. FIG. 5D shows a digital PDN model of the heterogeneous circuit generated according to an embodiment of the present disclosure. It may be known from above description that steps 320-350 are details of step 230.

It may be known from above description that the PDN model of the heterogeneous circuit may be generated in an embodiment of the present disclosure. Digital system voltage drop analysis (as indicated in step 240 of FIG. 2) may be performed on the generated PDN model of the heterogeneous circuit and the PDN of the digital circuit, and the PDN of the digital circuit 110 may be adjusted according to the result of voltage drop analysis such that the PDN of the digital circuit 110 may be optimized.

Figure 6:
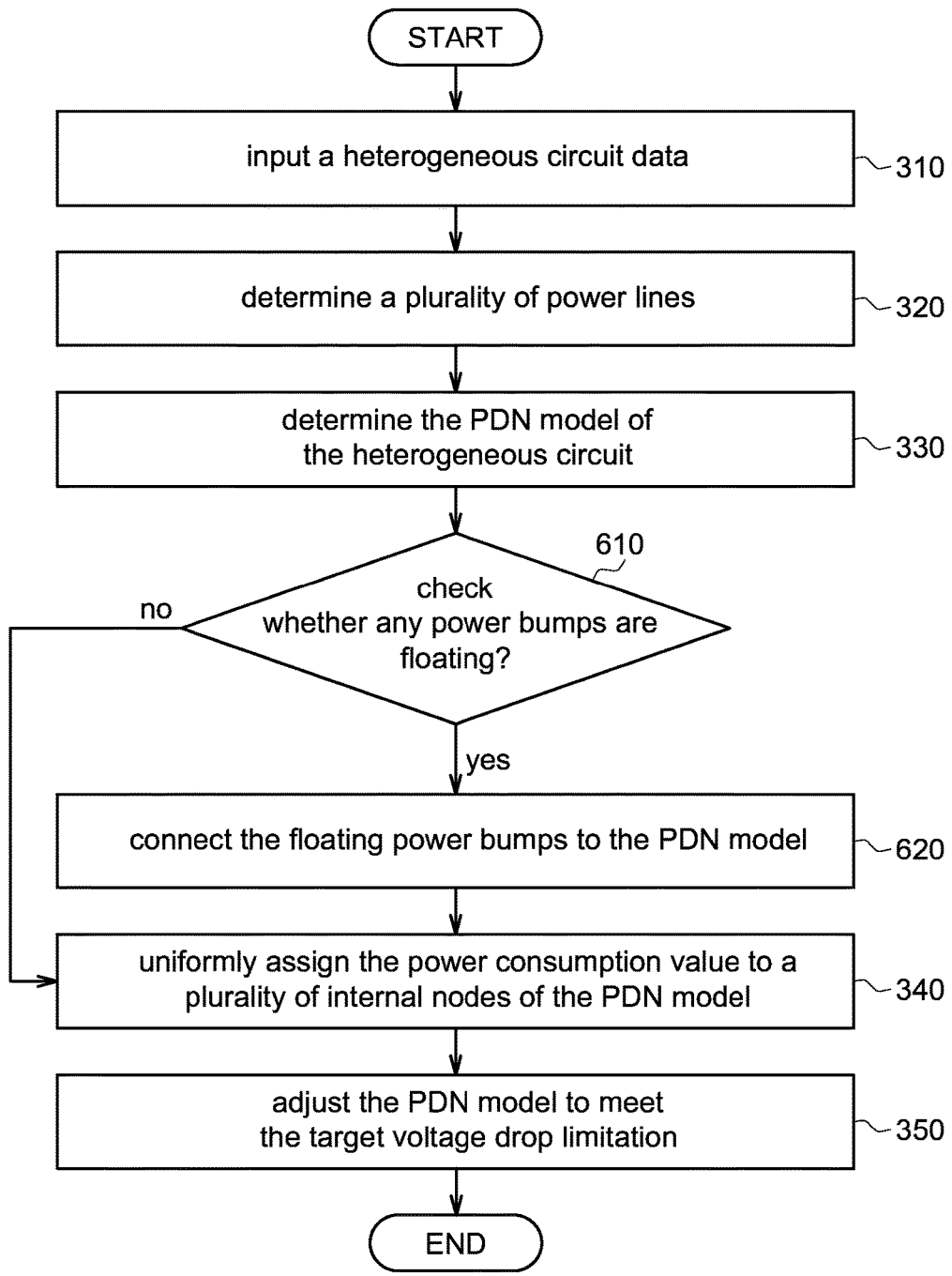
FIG. 6 shows a flowchart of a method for generating a PDN model of the heterogeneous circuit according to another embodiment of the present disclosure.
Figure 7A:
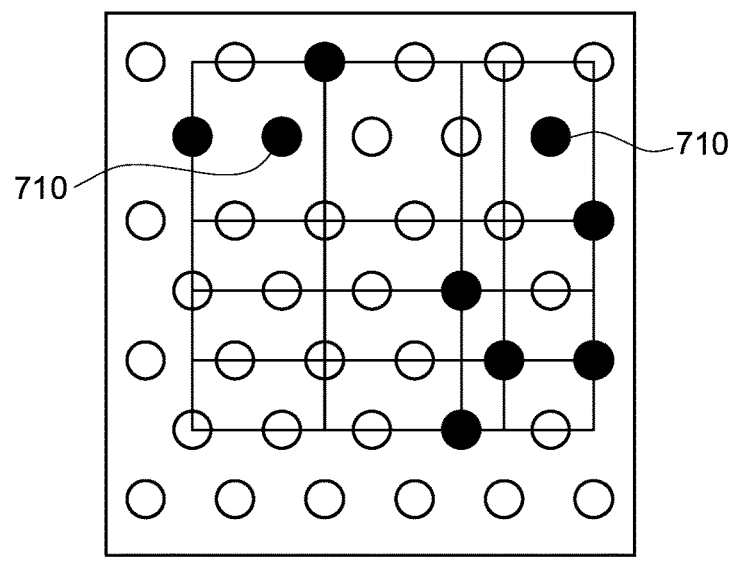
FIG. 7A shows a schematic diagram of floating power bumps according to an embodiment of the present disclosure.
Figure 7B:
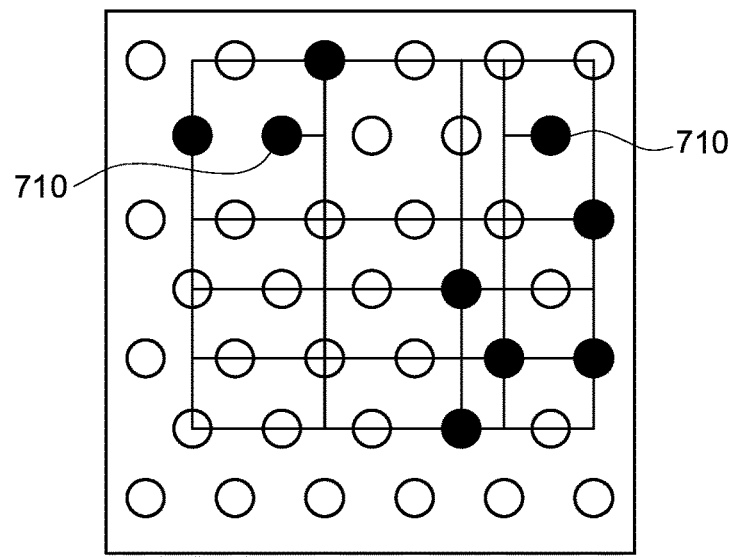
FIG. 7B shows a schematic diagram of connecting floating power bumps to the PDN model via a shortest path according to an embodiment of the present disclosure.

Referring to FIG. 6, a flowchart of a method for generating a PDN model of the heterogeneous circuit according to another embodiment of the present disclosure is shown. Steps 310~330 and 340~350 of FIG. 6 basically are the same as steps 310~350 of FIG. 3. In step 610 of FIG. 6, whether any power bumps of the PDN model determined in step 330 are floating is checked. The floating power bumps, such as the power bump 710 of FIG. 7A, refer to the power bumps not connected with the PDN model. If there are any floating power bumps in the PDN model, the embodiment of the disclosure connects the floating power bumps to the PDN model as indicated in step 620 in an embodiment of the present disclosure. Specifically, the floating power bumps are connected to the PDN model through a shortest path as indicated in FIG. 7B. Individual distances between a floating power bump and its four adjacent power lines (that is, the power lines at the top, the bottom, the left and the right of the floating power bump) are calculated to determine the power line closest to the floating power bump. Then, the floating power bump is connected to the closest power line. In the present embodiment, the reasons why there are floating power bumps in the PDN model includes are as follows. The quantity m' of horizontal power lines of FIG. 7A is smaller than the maximum possible quantity M of horizontal power lines of FIG. 5A by 1, and the quantity n' of vertical power lines of FIG. 7A is smaller than the maximum possible quantity N of vertical power lines of FIG. 5A by 1 (m'+n'≤M+N−2), therefore some power bumps do not intersect with any power lines. However, the condition of (m'+n'≤M+N−2) does not necessarily make floating power bumps.

Figure 8:
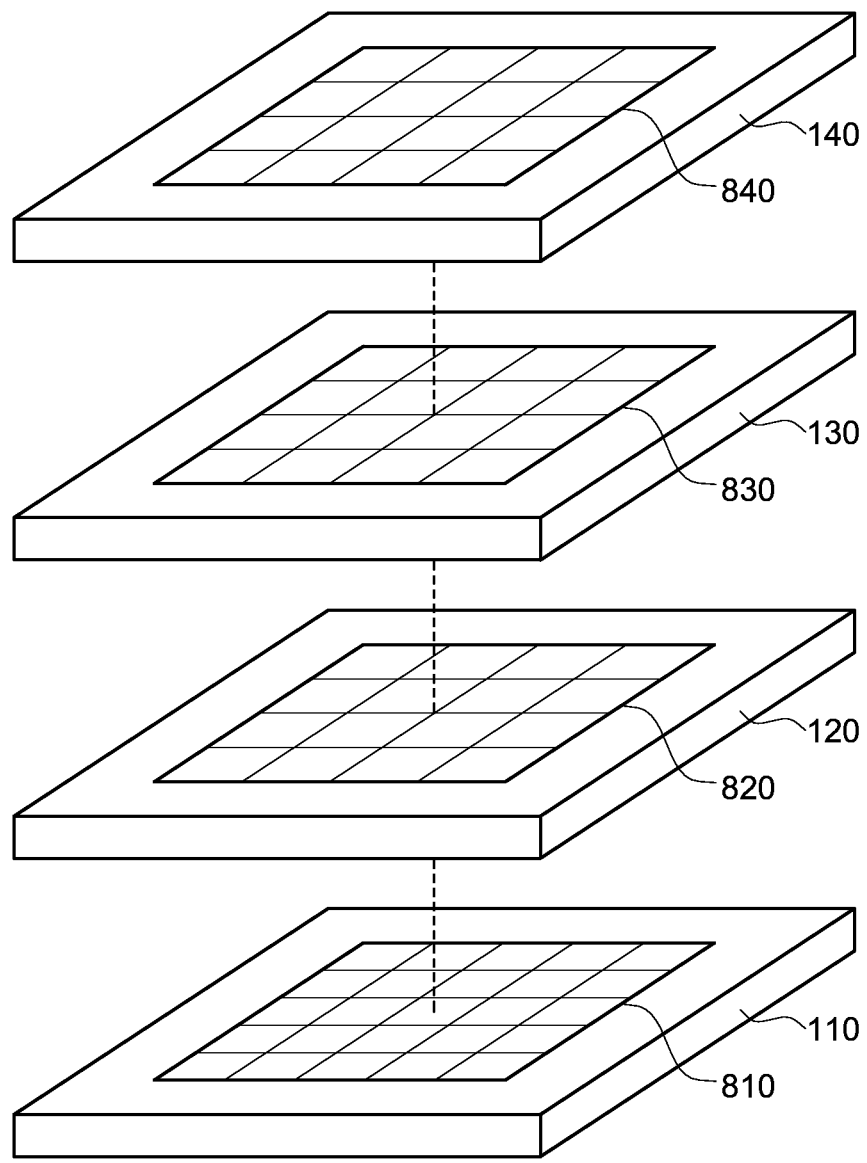
FIG. 8 shows a schematic diagram of stacking several heterogeneous circuits on a digital circuit for performing digital system voltage drop analysis according to an embodiment of the present disclosure.

Referring to FIG. 8, a schematic diagram of stacking several heterogeneous circuits 120~140 on the digital circuit 110 for performing digital system voltage drop analysis according to an embodiment of the present disclosure is shown. The PDN models 820~840 of the heterogeneous circuits 120~140 may be generated according to the above description. The PDN 810 of the digital circuit 110 may be adjusted according to a result of voltage drop analysis.

In an embodiment of the present disclosure, during digital system voltage drop analysis, RC extraction, power calculation, and IR analysis may be performed by using an ordinary IR analysis engine to obtain the voltage drop of each node of the PDN model.

Figure 9:
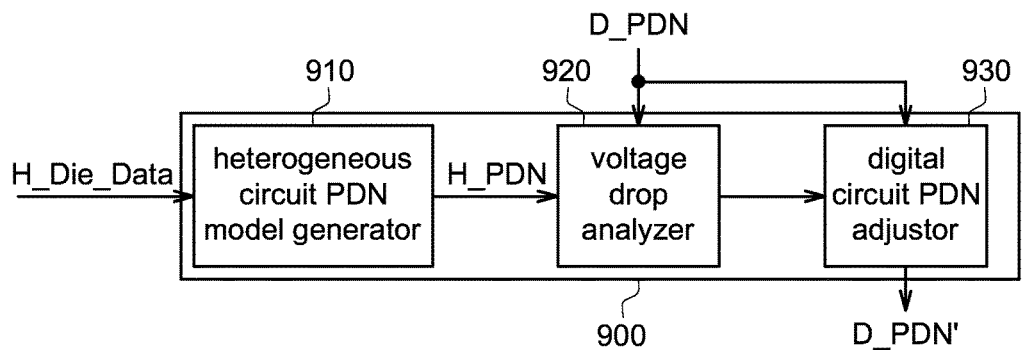
FIG. 9 shows a block diagram of a PDN analysis device according to an alternate embodiment of the present disclosure.

Referring to FIG. 9, a block diagram of a PDN analysis device according to an alternate embodiment of the present disclosure is shown. As indicated in FIG. 9, the PDN analysis device 900 includes: a heterogeneous circuit PDN model generator 910, a voltage drop analyzer 920 and a digital circuit PDN adjustor 930.

The heterogeneous circuit PDN model generator 910 receives a heterogeneous circuit data H_Die_Data to generate a heterogeneous circuit PDN model H_PDN. Detailed descriptions of the heterogeneous circuit PDN model generator 910 may be obtained with reference to FIG. 3 and FIG. 6. In an embodiment of the present disclosure, a heterogeneous circuit data is inputted to the heterogeneous circuit PDN model generator 910 to generate the format or file used in ordinary digital process. Examples of the format or file include data exchange format (DEF), library exchange format (LEF), liberty timing file (LIB). DEF is a document format describing geometric data such as the coordinates of each cell in chip layout and the position and dimension of metal wires. LEF is a document format describing geometric data of cells. LIB is a document format describing the delay time and power of cells. The heterogeneous circuit PDN model generator 910 performs, for example, steps 230, 320~350 and 610~620.

The voltage drop analyzer 920 performs digital system voltage drop analysis on the heterogeneous circuit PDN model H_PDN and the digital circuit PDN (D_PDN), and the details are not described here. The voltage drop analyzer 920 performs, for example, step 240.

The digital circuit PDN adjustor 930 adjusts the digital circuit PDN (D_PDN) as an adjusted digital circuit PDN (D_PDN') according to an analysis result of the voltage drop analyzer 920, and the details are not described here. The digital circuit PDN adjustor 930 performs, for example, step 250.

In an embodiment, the heterogeneous circuit PDN model generator 910, the voltage drop analyzer 920 and the digital circuit PDN adjustor 930 disclosed above may respectively be implemented by hardware. In another embodiment, the heterogeneous circuit PDN model generator 910, the voltage drop analyzer 920 and the digital circuit PDN adjustor 930 may be implemented by software. Exemplarily but not restrictively, the heterogeneous circuit PDN model generator 910, the voltage drop analyzer 920 and the digital circuit PDN adjustor 930 may be implemented in devices such as server, computer, laptop, tablet PC and mobile device (such as mobile phone). When the heterogeneous circuit PDN model generator 910, the voltage drop analyzer 920 and the digital circuit PDN adjustor 930 are implemented in a server, the server may include a processor, a memory and a storage device. The processor performs the functions of the heterogeneous circuit PDN model generator 910, the voltage drop analyzer 920 and the digital circuit PDN adjustor 930. The memory stores the programs of the heterogeneous circuit PDN model generator 910, the voltage drop analyzer 920 and the digital circuit PDN adjustor 930. The storage device (such as hard disc, solid-state hard disc) stores the heterogeneous circuit data H_Die_Data, the heterogeneous circuit PDN model H_PDN, and the formats or files (such as DEF, LEF, and LIB) used in digital process, the digital circuit PDN (D_PDN) and/or the adjusted digital circuit PDN (D_PDN'). The above description is exemplified by server. By the same analogy, the heterogeneous circuit PDN model generator 910, the voltage drop analyzer 920 and the digital circuit PDN adjustor 930 may also be implemented in computer, laptop, tablet PC or mobile device, and the similarities are not repeated here. In addition, the embodiment of the present disclosure may also be implemented by firmware.

Table 1 shows a comparison of digital system voltage drop analysis between the heterogeneous circuit PDN model generated according to an embodiment of the present disclosure, background technology (PDN model is not generated) and actual circuit of the heterogeneous circuit. As indicated in Table 1, the voltage drop of the model generated according to an embodiment of the present disclosure is close to the voltage drop of actual circuit, but simulation time and data size of the model generated according to an embodiment of the present disclosure are far smaller than that of actual circuit. The experimental data shows that the technology of the present disclosure effectively generates the PDN of actual circuit, and this technical advantage is not achieved by background technology.

TABLE 1

|  | Actual circuit | Background technology | An embodiment of the present disclosure |
| --- | --- | --- | --- |
| Data size | 82.5 MB | 12.2 KB | 159.8 KB |
| Simulation time (sec) | 264 | 21 | 22 |
| Voltage drop | 11.2% | 0% | 11.1% |
| Error | 0% | 100% | 0.9% |

In Table 1, "error" is calculated according to digital values of actual circuit. The error of an embodiment of the present disclosure is defined as: 100%*(|VD1−VD2|)/VD2, wherein VD1 refers to the voltage drop of an embodiment of the present disclosure and VD2 refers to the voltage drop of actual circuit. The symbol "|" denotes absolute value. The error of background technology is defined as: 100%*(|VD3−VD2|)/VD2, wherein VD3 refers to the voltage drop of background technology. The comparison of error shows that the model generated according to an embodiment of the present disclosure has very small error.

Table 2 shows a comparison between an embodiment of the present disclosure and background technology. The difference exactly illustrates the technical advantages of the embodiment of the present disclosure.

TABLE 2

|  | Background technology | An embodiment of the present disclosure |
| --- | --- | --- |
| Data size (KB) | 41.5 | 59.4 |
| Simulation time (s) | 843 | 897 |
| Adjusted PDN voltage drop | 1.141 V | 1.099 V |

TABLE 2-continued

|  | Background technology | An embodiment of the present disclosure |
| --- | --- | --- |
| of heterogeneous circuit | (4.92%) | (8.42%) |
| Adjusted voltage drop of digital circuit PDN | 1.141 V (4.92%) | 1.147 V (4.42%) |
| Area of adjusted digital PDN ($\mu m^2$) | 1,297,962 | 940,647 |
| Support stacking structure | 1 | All are applicable |

Table 1 shows that the result of an embodiment of the present disclosure is more accurate than that of background technology. Therefore, if the PDN model generated according to an embodiment of the present disclosure is used as a reference for designing or adjusting the PDN of the digital circuit, the reliability will be higher than that of the background technology. Table 2 shows that since no PDN model is generated in the background technology, the voltage drop is mainly occurred in the digital circuit and there is almost no voltage drop in the heterogeneous circuits. Therefore, the PDN of the digital circuit needs more area for compensation. Besides, the PDN model generated in the embodiment of the present disclosure may be used to support more stacking structures, and the circuit of the background technology is limited to be used as a loading end and thus is unable to support more stacking structures.

As indicated in an embodiment of the present disclosure, since no intellectual property information and confidential information of the heterogeneous circuit are required during the generation of the digital PDN model, intellectual property information and confidential information will not be indulged (particularly when the heterogeneous circuit is provided by a third party).

In an embodiment of the present disclosure, a heterogeneous circuit PDN model compatible with digital design flow is provided for performing integration analysis of the heterogeneous system.

In an embodiment of the present disclosure, an equivalent simplified model satisfying target voltage drop limitation is provided, and the computation complexity is not high.

In comparison to the analysis result of a system which does not generate the PDN model of the heterogeneous circuit, the analysis result of an embodiment of the present disclosure is more accurate. Therefore, the development of the digital circuit PDN of the circuit system will not be too pessimistic or too optimistic.

In an embodiment of the present disclosure, the digital PDN model of the heterogeneous circuit is automatically generated and is compatible with current digital design flow, and PDN simulation and analysis are performed on the heterogeneous circuit (such as non-digital circuit) and the digital circuit (such as logic control circuit) together. Thus, the stacking integrated design problem which was unpredictable in the past is now predictable, and the voltage drop problem may thus be resolved.

Still further, in an embodiment of the application, a PDN model of the heterogeneous circuit is generated and the heterogeneous circuit is introduced in digital design process, such that analysis accuracy may be increased without increasing too much processing time.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A power distribution network (PDN) analysis device implemented in an electronic device, comprising:
   a heterogeneous circuit PDN model generator, receiving a heterogeneous circuit data to generate a PDN model of the heterogeneous circuit;
   a voltage drop analyzer, performing digital system voltage drop analysis on the PDN model of the heterogeneous circuit and a PDN of a digital circuit; and
   a digital circuit PDN adjustor, adjusting the PDN of the digital circuit according to an analysis result of the voltage drop analyzer;
   wherein the heterogeneous circuit PDN model generator, the voltage drop analyzer and the digital circuit PDN adjustor are implemented by a processor of the electronic device; and a memory of the electronic device stores programs of the heterogeneous circuit PDN model generator, the voltage drop analyzer and the digital circuit PDN adjustor.

2. The device according to claim 1, wherein the digital circuit PDN adjustor:
   adjusts a width of at least one of the horizontal power lines and the vertical power lines of the PDN model of the heterogeneous circuit to meet a target voltage drop limitation; or,
   increases or decreases a quantity of power lines of the PDN of the digital circuit.

3. The device according to claim 1, wherein
   the heterogeneous circuit data comprises: a chip size, a power consumption value, a bump distribution data and/or the target voltage drop limitation.

4. The device according to claim 3, wherein
   the heterogeneous circuit PDN model generator determines a plurality of positions of the horizontal power lines and the vertical power lines according to a plurality of positions of a plurality of power bumps of the bump distribution data, wherein each power bump is located at an intersection between one of the horizontal power lines and one of the vertical power lines.

5. The device according to claim 4, wherein the heterogeneous circuit PDN model generator:
   obtains M first projection points and N second projection points from mapping of the positions of the power bumps (M and N are both positive integers);
   generates the horizontal power lines by horizontally extending m points of the first projection points (m≤M is a positive integer); and
   generates the vertical power lines by vertically extending n points of the second projection points (N≤N, n is a positive integer),
   intersects the horizontal power lines and the vertical power lines to form the PDN model of the heterogeneous circuit.

6. The device according to claim 4, wherein
   the heterogeneous circuit PDN model generator determines a boundary of the PDN model of the heterogeneous circuit according to the positions of the power bumps or according to the chip size.

7. The device according to claim 5, wherein
   the heterogeneous circuit PDN model generator assigns each internal node an internal node power consumption value which is equivalent to p_con/(m*n−b), wherein b denotes a quantity of the power bumps, and p_con denotes the power consumption value; or
   the heterogeneous circuit PDN model generator assigns each internal node the internal nodes power consumption value which is equivalent to p_con/(m*n).

8. The device according to claim 4, wherein
   if the PDN model of the heterogeneous circuit comprises a floating power bump, the heterogeneous circuit PDN model generator connects the floating power bump to the PDN model of the heterogeneous circuit via a shortest path.

9. The device according to claim 3, wherein
   the digital circuit PDN adjustor adjusts a width of at least one of the horizontal power lines and the vertical power lines of the PDN model of the heterogeneous circuit, so that individual voltage drop of each internal node of the PDN model of the heterogeneous circuit meets the target voltage drop limitation.

* * * * *